Aug. 12, 1952     J. B. DYER     2,606,452
TRANSMISSION
Filed Aug. 10, 1948
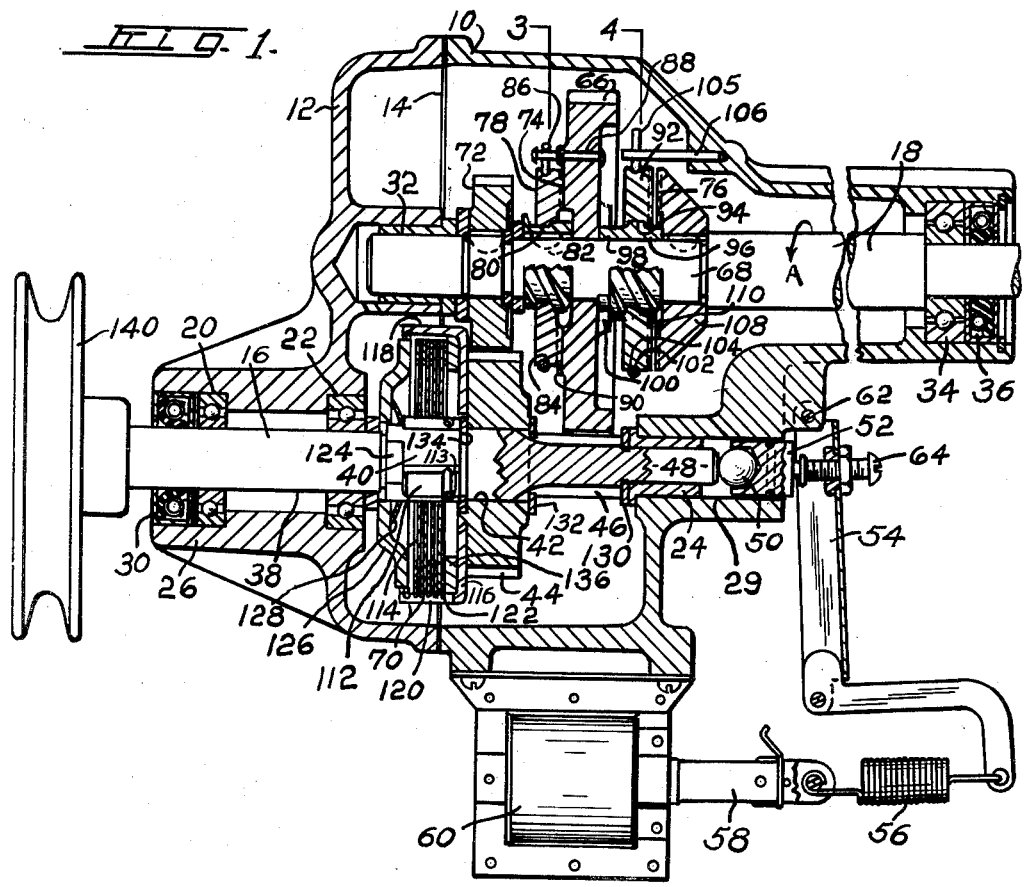
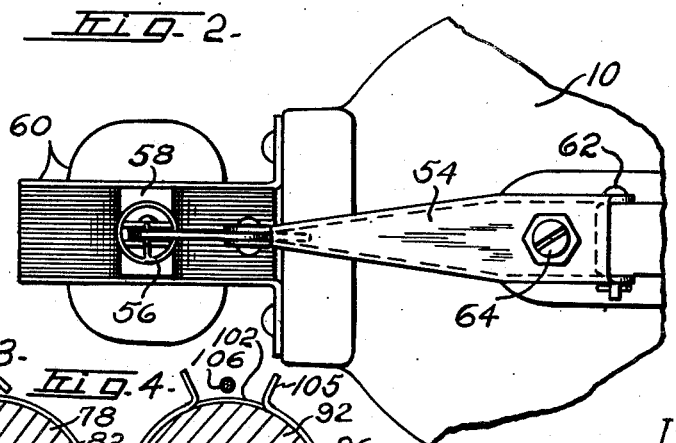
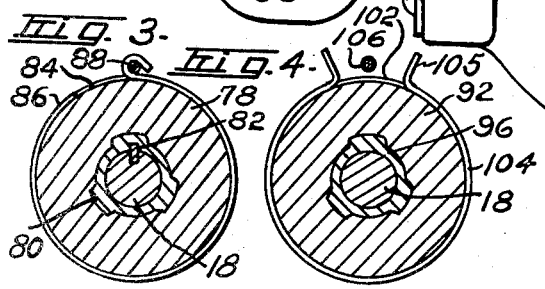
INVENTOR
JOHN B. DYER
BY *F. P. Keiper*
ATTORNEY Patented Aug. 12, 1952

2,606,452

UNITED STATES PATENT OFFICE 2,606,452

TRANSMISSION

John B. Dyer, Syracuse, N. Y., assignor to Easy Washing Machine Corporation, Syracuse, N. Y., a corporation of Delaware Application August 10, 1948, Serial No. 43,509

2 Claims. (Cl. 74—368)

1

This invention relates to transmissions, and more particularly to simplified speed changing controls therefor.

Transmissions are required for providing several speeds, such as may be employed in washing machines and the like wherein several operational steps such as tumbling and spinning are provided. In one type of machine, tumbling takes place at slow speed in either direction and subsequently extraction is provided at a higher speed. In such transmissions, ease or simplicity of control is desirable, as well as a smooth transition from low speed to high speed. A single control means which may be solenoid operated is highly desirable. Such transmissions employ a clutch having the smooth transition characteristics such as a disk or a multiple disk type clutch, and overrunning clutches so that merely completing drive through one gear train where two gear trains of different speeds are provided causes overrunning of the other, immediately rendering the other ineffective.

The present invention is directed to the control of a disk clutch in such a combination, the control being effected by the expedient of shifting the shaft upon which the clutch is mounted.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1 shows a longitudinal sectional view through the transmission on a plane taken through the drive and driven shafts, with certain parts shown partly in section and in elevation;

Figure 2 is a fragmentary end elevation of the shifter linkage;

Figure 3 is a section taken on line 3—3 of Figure 1; and

Figure 4 is a section taken on line 4—4 of Figure 1.

In Figure 1, there is shown a gear box housing composed of two members 10 and 12 joined together along the plane 14. Within the housing is a driving shaft 16 and a driven shaft 18 arranged parallel to the driving shaft and laterally spaced therefrom. The driving shaft 16 is mounted at one end in ball bearings 20 and 22, and at the other end in a sleeve bearing 24, the

2 ball bearings being mounted in a boss 26 in the housing member 12, and the sleeve bearing 24 being mounted in an aligned aperture 28 in the housing member 10.

The shaft 16 is mounted for slight endwise sliding movement in the bearings set forth for actuation of a clutch which will be more particularly described hereinafter. A suitable grease retainer 30 is provided in the end of the boss 26 to prevent loss of lubricant contained within the housing. The driven shaft 18 is journaled in the housing member 12 as at 32 and in the housing member 10 as at 34, there likewise being provided a grease retainer 36.

The shaft 16 is provided with a cylindrical portion 38 slidably mounted in the bearings 20, 22 and 24, a clutch disk assembly supporting portion 40, a cylindrical bearing 42 for a clutch driven gear 44 and spline-like pinion teeth 46 integrally formed in the shaft. The right hand end 48 of the shaft which is journaled in the bearing 24 is adapted to bear against an axially movable thrust ball 50 contained in a shiftable plug member 52, which is in turn actuated by a lever 54 and spring connection 56 to the armature 58 of a solenoid 60. The lever 54 is pivoted upon the housing member 10 as at 62 and is provided with an adjustable screw 64 adapted to bear against the ball retaining plug 52.

The transmission is adapted, as previously described, to the driving of mechanism in either direction at a reduced rate of speed and in one direction at a relatively high rate of speed. The reduced rate of speed results from a direct drive from the driving shaft 16 through the spline-like pinion teeth 46 to a spur gear 66 journaled upon the reduced diameter portion 68 of the driven shaft 18. Clutch means are provided for causing the spur gear 66 to rotate the shaft 18 whenever the driven shaft is not caused to overrun the spur gear 66 as during the high speed drive. It will appear that a high speed drive is imparted to the driven shaft 18 when the gear 44 is clutched to the driving shaft 16 by the multiple disk clutch 70, the gear 44 driving a pinion 72 keyed to the driven shaft 18.

When the clutch 70 is in released position, so that the gear 44 rotates freely upon the driving shaft 16, the spur gear 66 is caused to drive the driven shaft 18 through either one of two overrunning clutches designated as at 74 or 76. The overrunning clutch 74 comprises a ring member 78 having a multiple thread screw connection upon a complementary threaded sleeve 80 keyed to the shaft 18 as at 82. The ring member 78 is provided with an annular external groove 84 in which is positioned a resilient friction C-ring 86 having one end carried upon a pin 88 projecting laterally from the side of the spur gear 66 (see Figure 3). The opposed side faces of the ring member 78 and the spur gear 66 are notched as at 90 to provide shallow face jaw clutch teeth. The arrangement is such that upon rotation of the spur gear 66 in the direction of arrow A, the ring member 78 will be caused to rotate by reason of the self-energizing friction action of the friction ring 86 around the periphery of the ring member. Such action will cause the ring member to screw to the right upon the sleeve 80 and will cause the jaw faces 90 to engage and thereafter directly drive the driven shaft 18 from the spur gear 66.

Upon rotation of the spur gear 66 in a direction opposite to that from arrow A, the overrunning clutch 76 will be caused to provide a direct driving connection between the spur gear 66 and the driven shaft 18. The overrunning clutch 76 comprises a ring member 92 having an internal multiple thread screw 94 threaded upon a sleeve 96, the latter having endwise teeth 98 adapted to coact with complemental teeth 100 on the hub of the spur gear 66, whereby the sleeve 96 at all times rotates with the spur gear 66. The ring member 92 has an external annular groove 102 therein, in which is positioned a resilient friction C-ring 104, the ends of which are prevented from rotation by engagement of either one of the radially outwardly extending end ears 105 with a housing mounted pin 106. Keyed to the shaft 18 is an annular clutch block 108. The ring element 92 and clutch block are provided upon their opposed faces with shallow face jaw clutch teeth 110. Thus, it will be seen that when the spur gear 66 rotates in a direction opposite to that of arrow A, the threaded sleeve 96 tends to rotate the ring member 92, whereas the C-ring 104 tends to retard such ring member, thereby causing the ring member 92 to move to the right thereby engaging the jaw clutch teeth 110. Thus, a direct drive is established between the spur gear 66 and the driven shaft 18.

The driving shaft 16 is provided with a plurality of spline-like members 112 upon which are slidably mounted but keyed for rotation therewith a plurality of clutch disks 114. A split spring ring 113 provides a suitable limit for the disks. Rigidly secured to the left hand face of the gear 44 is a clutch housing 116 having a cylindrical flange 118 provided with a plurality of axially extending slots 120. Splined in the slots 120 for rotation with the housing are a plurality of clutch disks 122 alternately disposed with respect to the clutch disks 114. The shaft 16 is provided with a pair of flats 124 on opposite sides adjacent the splines 112, and a clutch pressure plate 126 is mounted upon the shaft and provided with a central aperture complemental to and cooperating with the flats 124 so as to normally rotate with the shaft but at the same time be axially slidable with respect thereto. The splines 112 form abutments which engage a spring dished washer 128 which tends to normally shift the shaft 16 to the right and the pressure plate 126 to the left, so that normally the clutch disks 114 and 122 are free to rotate with respect to one another, all pressure being relieved therebetween.

The shaft 16 is provided with a washer 130 abutting against the ends of the spline gear teeth 46 to limit end motion in the right hand direction. There are also provided spring split ring washers 132 and 134 adapted to confine the gear 44 against axial movement with respect to the shaft 16. It will be seen that upon energizing the solenoid 60, the driving shaft 16 will be moved to the left flattening the dished ring 128 and causing the pressure plate 126 to bear against the bearing 22 which is constructed so as to withstand thrust in this direction. Movement of the shaft 16 moves the clutch housing 116 to the left, thereby squeezing the plates 114 and 122 together between the annular abutment 136 within the clutch housing 118 and the pressure plate 126. The friction developed between the disks causes the gear 44 to rotate, driving the shaft 18 at a speed higher than it would normally be driven by the spur gear 66 through the overrunning clutches 76 and 78.

The high speed drive will be in the direction of arrow A with the spur gear 66 turning in the some direction but at a relatively low speed. Under such circumstances, the ring element 92 will be caused to move upon the threaded sleeve 96 to the left, to disengage the dog clutch teeth 110, and the spring ring 104 will merely lightly engage the ring member 92 and tend to maintain the ring in a position to the left of that shown to maintain the clutch teeth 110 disengaged. At the same time, the ring spring 86 rotating at slower speed with gear 66 will tend to lightly retard the ring element 78, with the result that the threaded sleeve 80 will drive the ring element 78 to the left to disengage the clutch teeth 90. Thus, it will be seen that when the disk friction clutch 70 is engaged, the shaft 18 is free to rotate at a higher speed and overrun the spur gear 66, as when the rotation of shaft 18 is in the direction indicated by arrow A. However, if the friction clutch 70 be disengaged, then a drive is established in shaft 18 at reduced speed regardless of the direction of rotation.

It will be seen that the axial shift of shaft 16 in engaging or disengaging the clutch 26 is so slight as to permit of a belt drive through a pulley such as 140 keyed to shaft 16. It will be obvious, however, that any satisfactory drive may be utilized, it merely being necessary that some slight movement of the shaft be permitted for engagement and disengagement of the disk clutch. The arrangement is such that in a limited amount of space, two parallel shafts may be journaled in fixed spaced relation to one another, the journals acting on the left hand ends of the shafts being rigidly positioned in one housing element 12 and the bearings supporting the other ends of the shafts being rigidly positioned within the other housing element 10. Thus, shaft alignment is maintained to the end that accurately cut gears may always operate in true alignment and accurate meshing for quiet operation.

Although a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. In a variable speed transmission, a low speed gear train, a high speed gear train including a normally disengaged friction clutch, and common driving and driven shafts therefor, a rigid supporting structure including bearings for each of said shafts on opposite sides of said gear trains and clutch, said clutch being mounted on one of said shafts, means for engaging said clutch in response to axial movement of said clutch mounting shaft, said last named shaft being one piece and extending through and supporting parts of both gear trains, means acting in line with the end of said clutch mounting shaft for shifting said clutch mounting shaft bodily in its supporting structure bearings on opposite sides of said gear trains to engage said clutch, and resilient means urging said clutch to release position and counteracting said shifting means.

2. In a two-speed transmission, a housing, parallel one-piece driving and driven shafts, each journaled in opposite walls of said housing, a high speed gear train having constantly meshing driven and driving gears mounted on the driven and driving shafts respectively between said walls, said driven gear being keyed to said driven shaft, and said driving gear being freely rotatable on said driving shaft, a low speed gear train having constantly meshing driving and driven gears on said driving and driven shafts respectively between said walls, said driving gear being formed integrally with said driving shaft, and said driven gear being free on said driven shaft, overrunning clutch means adapted to connect said free driven gear to said driven shaft on rotation of said gear relative to said shaft in either direction, and means for rendering said overrunning clutch means inoperative upon rotation of said driven shaft in one direction at a speed greater than the rotation of said free gear in said one direction, a multiple disk clutch mounted upon said driving shaft between a wall of said housing and said free driving gear, said clutch having alternate disks splined to said driving shaft and to said free driving gear, means for frictionally engaging said friction disks including a pressure plate and said free driving gear, said pressure plate having a thrust bearing acting against said last-named housing wall and being mounted on the driving shaft on the other side of said disks from said last-named gear, thrust means on said driving shaft for axially thrusting said free driving gear toward said pressure plate upon axial movement of said shaft to frictionally engage said disks, and ball thrust means for moving said driving shaft axially acting on the end of the shaft journaled in the other housing wall.

JOHN B. DYER.

REFERENCES CITED

The following references are of record in the file of this patent:

UNITED STATES PATENTS

| Number | Name | Date |
|---|---|---|
| 2,130,855 | Oliver | Sept. 20, 1938 |
| 2,156,698 | Martin | May 2, 1939 |
| 2,178,712 | Whitney | Nov. 17, 1939 |
| 2,387,216 | Hood | Oct. 16, 1945 |
| 2,456,600 | Trout, Jr. | Dec. 14, 1948 |